Patented Oct. 22, 1929

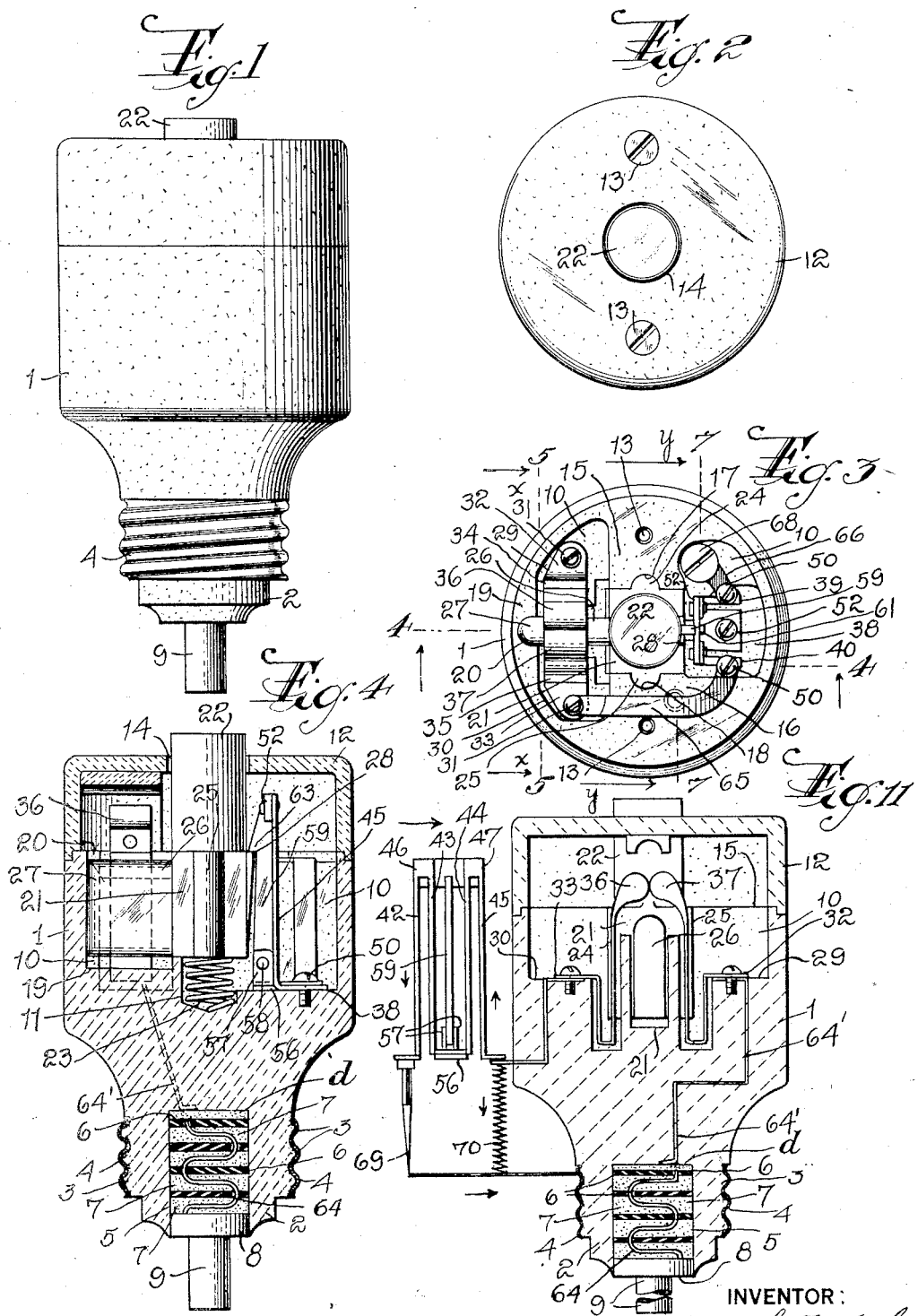

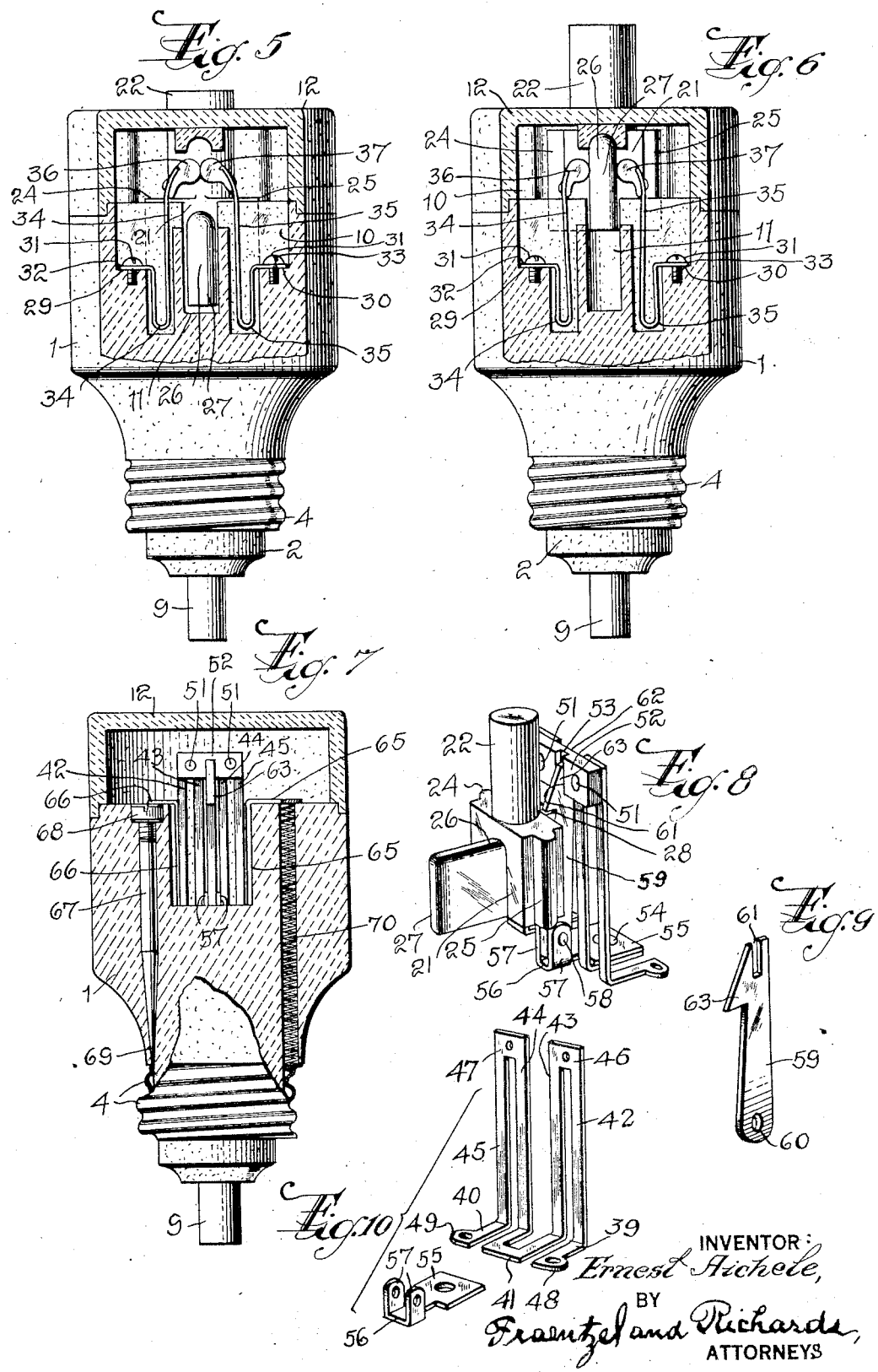

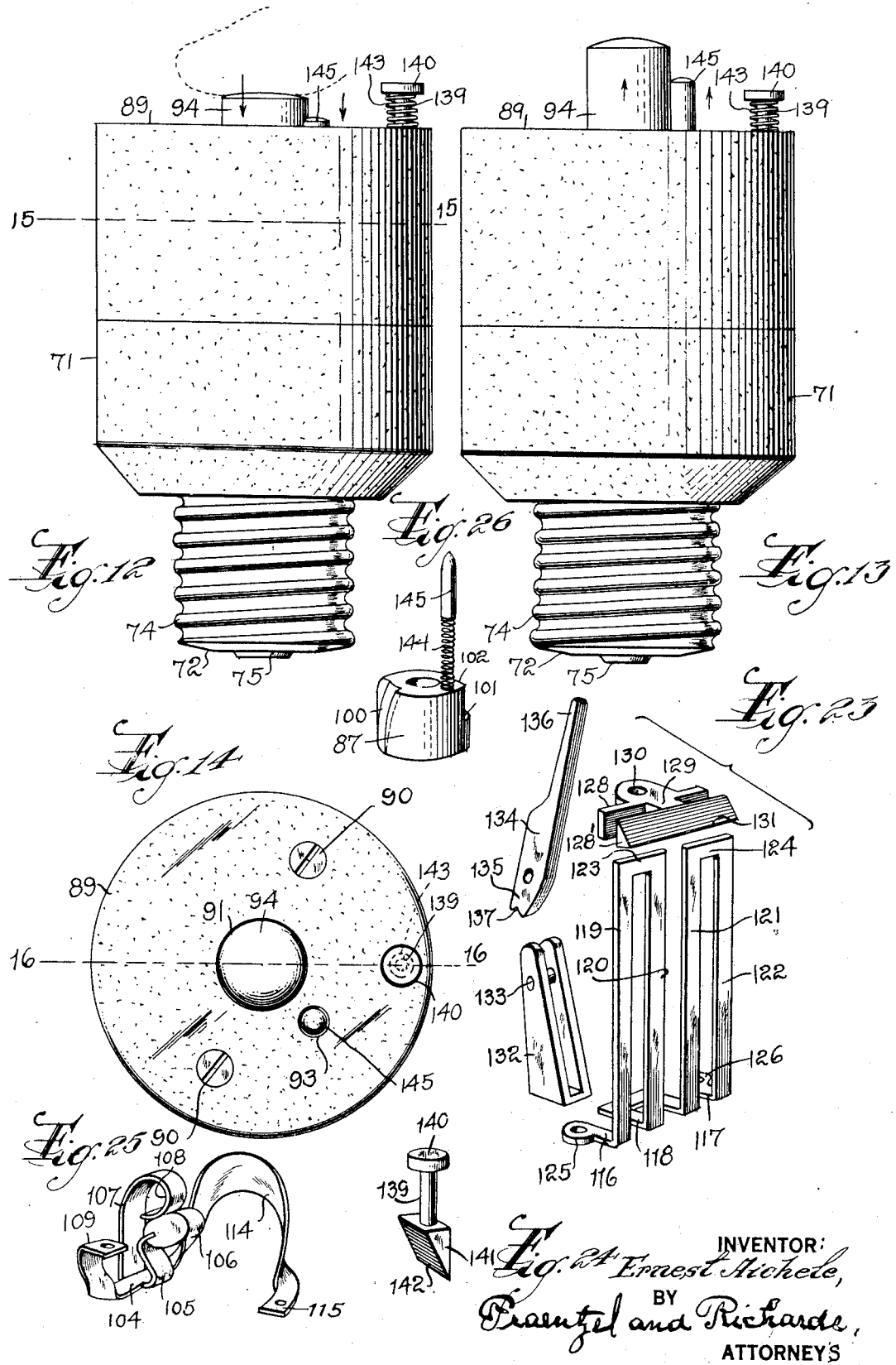

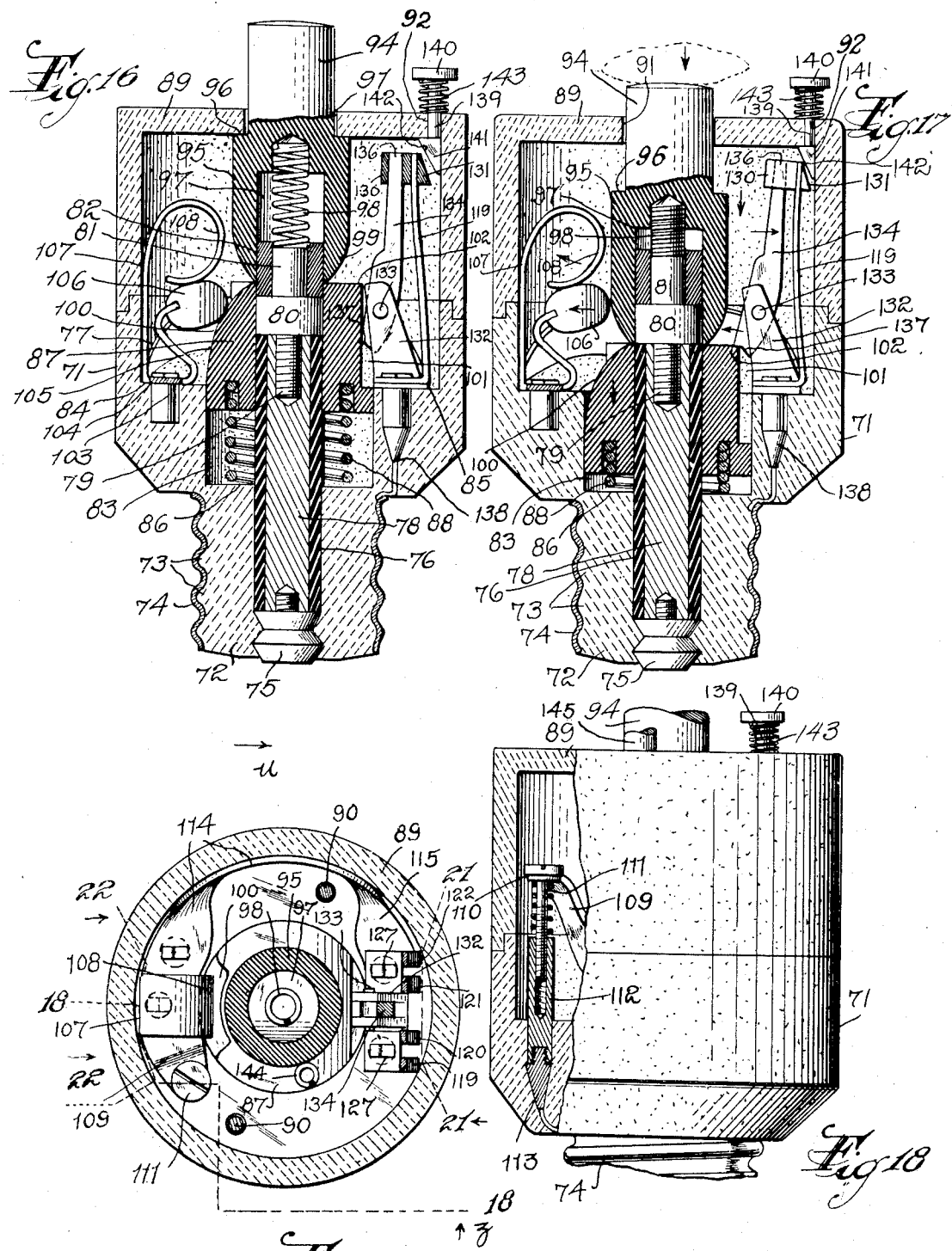

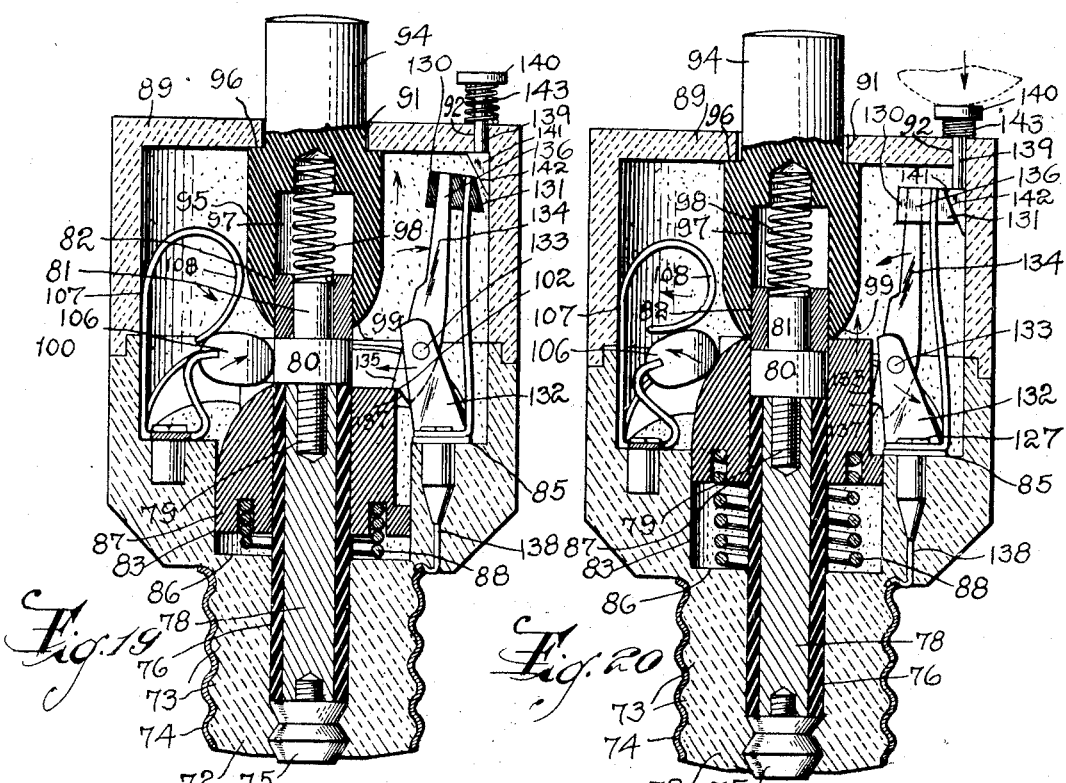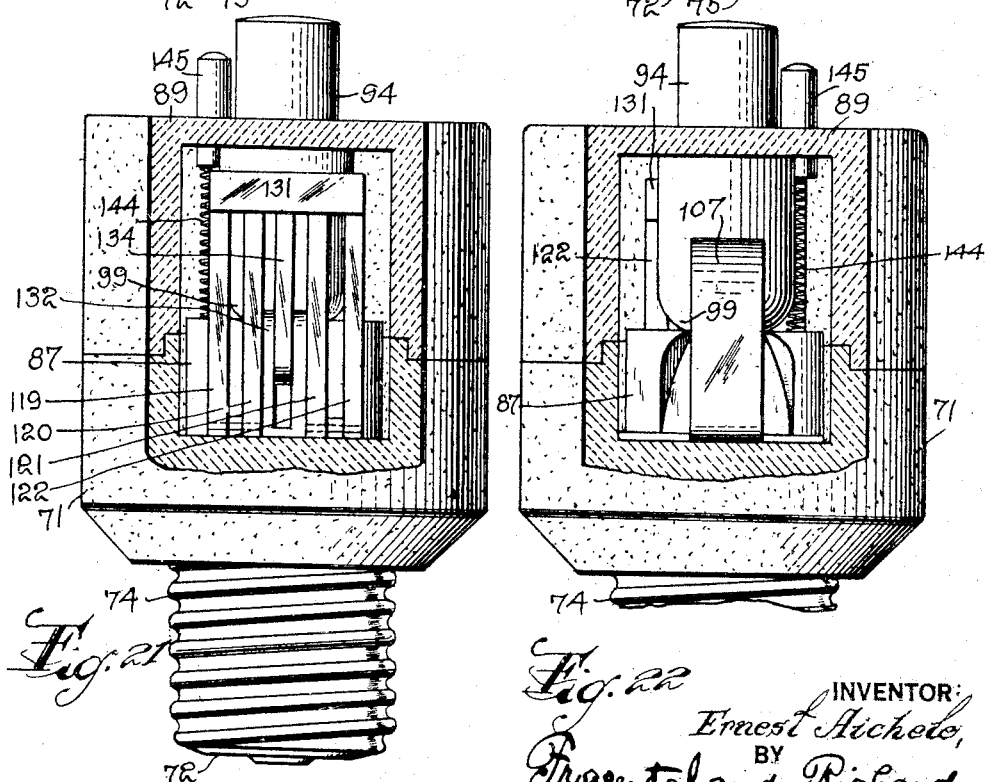

1,732,295

UNITED STATES PATENT OFFICE

ERNEST AICHELE, OF IRVINGTON, NEW JERSEY

CIRCUIT INTERRUPTER

Application filed February 26, 1926. Serial No. 90,778.

This invention relates, generally, to improvements in repeating circuit-interrupters; and, the present invention has reference, more particularly, to a novel construction of circuit-interrupter, which is preferably made in plug form, so as to be adapted for connection in the ordinary line-sockets, to provide, primarily, a safe-guard against injurious effects caused by abnormal over-loads and short-circuits; and, furthermore, to provide the circuit-interrupter with means, whereby the destructive effects of a powerful current of electricity through the device will be removed from the thermostatic control-element, so that with the various circuit-interrupters of different watt-rating, uniform and effectively acting thermostatic control-elements can be used, without risk of destroying the interrupter device for subsequent use after an exceptionally strong or powerful shock or overload has occurred in the circuit.

The present invention, therefore, has for its principal objects to provide, primarily, a novel, reliable, and simply constructed, as well as an automatically operating circuit interrupter or breaker, in the shape of the usual screw-plug, which is especially adapted for use with the usual screw-threaded receiving sockets of a switch-board, or a meter-board, or the like, the general construction and arrangement of the circuit-making and the circuit-interrupting elements of the device being such that the device can be repeatedly used, without deteriorating effect to either the device or to the installation in which the device is located.

In addition to the above-mentioned objects, however, the invention has for its further object to provide in connection with the automatically operating interrupter-mechanism of the device, means which will divide the path of an excessive overload-circuit, so that a reduced or normal current will flow through the thermostatic control-member, thereby permitting in all instances such members to be uniform, and to be constructed of thin flexible metal, without danger of melting or otherwise rendering inoperative the thermostatic control-member with consequent destruction of its usefulness for the purposes for which it is intended.

As a further precaution, the invention has for its further object to provide a thermostatic control-member having in lieu of a single thermostatic strip, a plurality of thin thermostatic strips, providing reverse or substantially U-shaped circuit-paths, thus producing a series of simultaneously actuated strips, which are more sensitive to the action of the circuit shocks, and thereby further providing a means in which the danger of fusing the strips is fully overcome.

With the above stated objects in view, the invention has for its further object to provide such circuit-interrupters or plugs with means for manually opening the circuit; and, furthermore, to provide the device with means which will automatically and positively act to open the circuit when there is an overload, by permitting the mechanism to trip even though the push-button of the device should be held down, or for some reason it should not return to its initial position.

Other objects of the present invention not at this time more particularly enumerated will be more fully understood from the following detailed description of the same.

With the various objects of the present invention in view, the said invention consists, primarily, in the novel electrical circuit-interrupter or breaker hereinafter set forth; and, the said invention consists, furthermore, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is fully illustrated in the accompanying drawings, in which:—

Figure 1 is a side elevation of a circuit-interrupter of the plug-type, made according to and embodying the main principles of the present invention; and Figure 2 is a top-end view of the same.

Figure 3 is also a top-end view of the device, with the cover-section of the device omitted from said view, and showing in plan, one general arrangement of the interrupter-mechanism within the chambered main shell or body of the device.

Figure 4 is a transverse vertical sectional representation of the device, said section being taken on line 4—4 in said Figure 3, said view also showing in connection therewith, and in section, the cover-section represented in its mounted position upon the main shell or body of the device.

Figure 5 is a similar sectional representation of the device, said section being taken on line 5—5 in said Figure 3, looking in the direction of the arrows x, said Figures 3, 4 and 5 showing the contact-making elements of the interrupter-mechanism in their initial positions, when a complete electrical circuit is being established through the device.

Figure 6 is a vertical sectional representation of the device, similar to Figure 5, showing the several contact-making elements of the interrupter-mechanism in their automatically separated relation, caused by an overload or short circuit in the main line; and Figure 7 is a transverse vertical section, taken on line 7—7 in said Figure 3, looking in the direction of the arrows y.

Figure 8 is a perspective view of the interrupter mechanism generally; and Figures 9 and 10 are similar views of certain parts, in detail, of the said interrupter or breaker-means. Figure 11 is a diagrammatical sectional representation of the devices and parts of the circuit-interrupter or breaker, said view illustrating more particularly the path of the electric circuit through said devices and parts.

Figures 12 and 13 are side elevations of a circuit-interrupter also of the plug-type, but showing another embodiment of the principles of the present invention, illustrating in connection with said figures, respectively, the positions of an indicating-element projecting through a perforation in the cover-section, the position of said indicating element in Figure 12 indicating a normal closed circuit, while the position thereof in Figure 13 indicates an interrupted circuit through the device; and Figure 14 is a top-end view of the said circuit-interrupter.

Figure 15 is a horizontal section of the device, said section being taken on line 15—15 in Figure 12. Figure 16 is a transverse vertical sectional representation of the device, said section being taken on line 16—16 in Figure 14, the same showing the several contact-making elements of the interrupter-mechanism in their automatically separated relation, caused by an over-load or short circuit in the main line; and Figure 17 is a similar view of the devices and parts illustrated in said Figure 16, showing the manner of returning the released parts of the device to their normal initial positions, so as to establish a complete electric circuit through the device.

Figure 18 is a view, partly in elevation and partly in vertical section, the section being represented as being taken on line 18—18 in Figure 15, looking in the direction of the arrow z.

Figure 19 is a transverse vertical sectional representation of the device similar to Figures 16 and 17, illustrating all of the parts of the device returned to their normal initial positions, after the operator has removed the hand from the push-button of the device; and Figure 20 is a similar sectional representation of the device, showing the manually operated positions of the parts of the device, when it is desired to provide an opened circuit.

Figures 21 and 22 are detail vertical sectional representations of the device, taken respectively on lines 21—21 and 22—22 in said Figure 15, looking in the direction of the several arrows in said figure.

Figure 23 is a perspective view, showing collectively the several members of the thermostatic control means used with the circuit-interrupter or breaker represented in said Figures 12 to 22 inclusive, Figure 24 is a perspective view of the releasing dog for manually releasing the interrupter-means; and Figures 25 and 26 are perspective views of certain other parts of the circuit-interrupter or breaker.

Similar characters of reference are employed in the above described views, to indicate corresponding parts.

Referring to the several figures of the drawings, the reference-character 1 indicates a main body or shell in which the interrupter-mechanism is arranged, the body in this case being of the plug-form or type and being made of a suitable insulating material, such as bakelite, porcelain, or any other suitable insulating material. Upon its lower portion, the said body is made with a reduced part 2, which is externally convoluted or screw-threaded, as at 3, for the reception thereon of a correspondingly convoluted or screw-threaded collar or ring 4, made of suitable metal, as brass, for screwing it into the usual internally screw-threaded receiving socket of a switch or meter-board, or the like, or in any suitable location in the circuit-line.

Referring now more particularly to Figures 4 and 11 of the drawings, it will be seen, that the said reduced part 2 may also be socketed, as at 5, in which may be disposed alternate layers 6 of suitable insulating material, and plastic masses 7 consisting of a low melting point metal, such as zinc, lead or the like combined with mercury, which masses are electrical conductors, the purpose of which will be subsequently described.

The said socket is closed preferably by means of a metal button 8, or the like, from which extends beyond the end of the reduced part 2, a contact-establishing member or stem, as 9.

In its upper part, the said body 1 is suitably chambered, as at 10, and in communication with said chamber, and extending downwardly in said body is a socketed part 11.

Suitably mounted upon the upper end-surface of said body 1 is a suitably formed cover or closure 12, also of a suitable insulating material, said cover being secured in its closing position upon said body by an arrangement of screws 13, or other suitable fastening means. The said cover or closure 12 is also made with an opening 14, in alinement with the previously mentioned socketed part 11. Referring to Figure 3 of the drawings, it will be seen that the body 1 is formed within its chamber 10 with inwardly extending solid portions 15 and 16, into which the screws 13 are screwed, the said portions being also formed with suitably shaped and vertically disposed guiding channels, as 17 and 18, and in a portion 19 of the said body 1, to the left of the chamber 10 is another suitably shaped and vertically disposed guiding channel, as 20.

The interrupter-mechanism is arranged within the said body 1, and the same consists, essentially, of a suitably shaped block 21, made of a suitable insulating material, said block being formed with an upwardly projecting manipulating post or member 22, which is yieldably projected upwardly through the opening 14 of the cover or closure 12 by the action of a coiled spring 23, which is placed beneath said block and has its lower portion centered in said socketed portion 11.

The said block 21 is also provided with guides 24 and 25 movably disposed in the channels 17 and 18, and with a laterally extending member 26, the vertical edge-portion 27 of which extends into and is movably disposed in the channel 20. At its edge-portion, opposite the said laterally extending member 26, the said block 20 has a hook-engaging portion, as 28, forming a stop-member. Suitably secured to suitably disposed off-set portions, as 29 and 30, within the body 1, see Figures 5 and 6, by means of screws 31, or in any other manner, are metal foot pieces 32 and 33, of suitably shaped resilient or spring-like arms 34 and 35, provided at their free end-portions with suitably shaped contact-members, as 36 and 37, which under certain conditions, owing to the resilient or spring-like action of the arms 34 and 35 are forced into contact with each other, as represented in said Figure 5, but which, under other conditions, are adapted to be brought into separated relation by the action of the member 26 of the block 20, as shown in Figure 6 of the drawings.

Suitably mounted upon a portion 38 of the body 1, opposite the portion 19, is a thermostatic control-element of the general construction represented in detail in Figures 8, 9 and 10 of the drawings. This device consists, essentially, of continuous strip of thermostatic metal, comprising a pair of base-members 39 and 40, and an intermediately disposed and substantially U-shaped base-member 41, from which extend, in upward directions, a plurality of resilient members, as 42, 43, 44 and 45, the members 42 and 43 being connected at their upper ends by a connecting portion 46, and the said members 44 and 45 being similarly connected at their upper ends by a connecting portion 47. The said base-members 39 and 40 are, respectively, provided with perforated ears 48 and 49 for reception of screws 50 by means of which the thermostatic control-element is secured in a vertical position upon the portion 38 within the chamber of the main body 1, as shown in Figures 3 and 4 of the drawings. Secured by means of rivets 51, or other suitable fastening means, to the portions 46 and 47 of the respective resilient members, is a cross-bar 52 of suitable insulating material, said bar being preferably made with a centrally disposed recessed or cut-away portion, as 53. Suitably connected with the U-shaped portion 41 of the thermostatic control-element by means of a screw 54, the shank of which is also screwed into the portion 38 of the main body 1, is a plate 55 having a forwardly extending part 56 and a pair of perforated ears 57 for the reception of a pintle 58. Mounted upon said pintle, by means of the eye-portion 60 is a retaining element 59 which is slotted, as at 61, and which slotted portion is fitted in embracing relation with the portion 62 of the bar 52, substantially as shown. The said element 59 is also made with a hook-shaped part 63, adapted to be brought into holding engagement with the hook-engaging portion 28 of the block 21 when the post or member 22 has been depressed, being held in this relation by the spring-like action of the resilient members 42, 43, 44 and 45 of the thermostatic control-element, which under normal conditions always is in the direction toward the said block.

Imbedded within the body-portion 1 and in the means formed by the insulating discs 6' and the intermediate plastic masses or layers 7, with one end attached to the metal button 8, and the opposite end of a terminal disc $d$, is a leading-in wire 64, which extends through openings in the insulation discs 6, so as to be imbedded in the plastic conductive masses 7. A conductor 64' is suitably connected with the upper side of the terminal disc $d$ to extend to the plate 32 of the arm 34. The contact resistance between the plastic masses and the wire 64 is relatively high, so that current of normal strength is substantially alone conducted by said wire 64. Said leading-in wire 64 is rated to carry a normal current load. In event of excessive current load, the contact resistance between the plastic masses 7 and wire 64 is overcome, and the plastic conductors 7 will take over part of the current load, thereby causing a drop in the strength of the current corresponding to the increased cross-section of the combined conducting material comprising the plastic masses 7 and wire 64, thus preventing a too sudden rise of current in the thermostatic element, and therefore the composite conductor formed by the plastic masses 7 and leading wire 64 provide, under such circumstances, a means in the nature of an electrical check-valve which protects the interrupter device and especially the thermostatic element from the destructive effects of a too suddenly applied excessive current load. Suitably connected with and leading from the plate 33 of the arm 35 is a metal conductor 65, which leads to and is attached by means of the screw 50 over the perforated ear 49 of the base-member 40 of the thermostatic control-member. Attached to the base-member 39 by means of the screw 50, over the perforated ear 48, and leading therefrom, is another metal conductor 66 having its other end-portion suitably connected with the head 68 of a screw or pin 67, also imbedded in the body-portion 1, and having its free end-portion 69 suitably attached to and connected in circuit with the convoluted or screw-threaded metal collar of ring 4. Another electrical lead or conductor, as 70, also imbedded in the body-portion 1, may also be employed, said lead being preferably made coil-form and of relatively high resistance material, and said lead or conductor 70 being suitably and electrically connected at its one end with the metal conductor 65, and having its other end suitably and electrically connected with the convoluted or screw-threaded metal collar or ring 4, substantially as indicated in Figure 7 of the drawings.

Having in the foregoing described the general construction and arrangement of the several devices and parts of the circuit breaker or interrupter of the form represented in said Figures 1 to 11 inclusive, I will now briefly set forth its use in connection with the usual receiving sockets of a meter or switch-board, or the like, and also for interrupting an electric circuit, when there is an overload or a short circuit.

Direction of the electric circuit through the circuit-breaker or interrupter, when secured into the socket, and when the various members of the interrupter-mechanism have been set in the positions indicated in Figures 1 to 5 inclusive, by pushing the stem or plug 22 in an inward direction, with the hook-engaging portion 28 of the block 21 in retained engagement with the hook 63 of the retaining element 59, is from the metal button 8, by means of the leading-in wire 64, through the electrical valve and thence through the conductor 64' to the plate 32 of the arm 34 into said arm and its contact-member 36, thence through the contact-member 37, the arm 35 and plate 33, through the conductor 65, into and out of the thermostatic-control, into the conductor 66 and the pin or screw 67 to the convoluted or screw-threaded ring or collar 4. thus completing the electric circuit with the socket into which the device has been screwed. Thus, when the various parts of the device are in their set positions, indicated in Figures 4 and 5 of the drawings, a complete electric circuit is established. At the moment, however, when an overload or short circuit occurs in the main line, the increase caused by the overload, will cause the thermostatic control-element to be come deflected in the direction of the arrow, in Figure 4, thereby automatically causing the disengagement of the two members 28 and 63. The compressed spring 23 now becomes active, causing the setting stem or post 22 and the block 21 to move in an outward direction, and thereby interrupting or breaking the electrical circuit, due to the separation of the contact-members 36 and 37 of the resilient or spring-arms 34 and 35 by the interposed insulator element 26, as will be fully understood from an inspection of Figure 6 of the drawings.

From an inspection of the diagrammatic representation of the main elements of the device, as shown in Figure 11, and also from an inspection of Figure 7, it will be apparent that the tendency of the current flow is to divide itself into two paths, in directions indicated by the arrows in said Figure 11; one path being through the thermostatic control-means and conductor 67, and the other through the by-passing conductor 70. By thus dividing the current flow, the amount of current passing through the thermostatic control is reduced, so that although said thermostatic control will be properly deflected by increase of the normal amount of current occurring in the event of an overload, yet, even under such circumstances, the overload current will not be permitted to attain a strength sufficient to fuse the thermostatic control-means or otherwise impair the future usefulness of the same.

Referring now to Figures 12 to 26 inclusive of the drawings, I have shown therein a circuit-interrupter or breaker of a somewhat different construction, but still embodying the principles of the present invention, the device being represented, also, with auxiliary devices, such as means for manually actuating the interrupter-mechanism, and with indicating means which visually indicates whether the interrupter mechanism has been set, or whether it has been released.

In said figures, the reference-character 71 indicates the main body or shell in which the interrupter-mechanism is arranged, the body or shell being also made of a suitable insulating material. Upon its lower portion, this body is made with a reduced part 72, which is externally convoluted or screw-threaded, as at 73, for the reception thereon of a correspondingly convoluted or screw-threaded metal collar or ring 74, for screwing the device into the usual screw-threaded receiving socket of a switch, or meter-board, or the like, or placed in any suitable location in a circuit-line.

As will be seen from an inspection of Figures 16, 17, 19 and 20, the reduced portion 72 has imbedded therein a contact-establishing button 75 of metal, with which is suitably connected an upwardly projecting metallic stem 78, the upper portion of which extends into and terminates in the chamber 77 with which the body 71 is provided. Around said stem 78 is a sleeve of insulating material, as 76, and screwed into the upper portion of said stem 78, or otherwise secured, is a metal shank 79, provided with a cylindrical enlargement or boss 80 corresponding in diameter to and so as to be flush with said sleeve 76. Extending upwardly from said enlargement or boss is another stem or shank 81, which is surrounded by a collar or sleeve 82 of insulating material. In communication with the chambered portion 77 is a socketed part 83, these being arranged so as to provide suitable off-sets 84, 85 and 86. Movably or slidably disposed upon a portion of the sleeve 76, upon the enlargement or boss 80, and upon a portion of the collar or sleeve 82, is a suitably shaped block 87 of insulating material, the lower portion of said block projecting into the socketed part 83, and being supported upon a compressible coiled spring 88, substantially as indicated in said Figures 16, 17, 19 and 20.

Suitably mounted upon the upper end-surface of said body 71 is a suitably formed cover or closure 89, of a suitable insulating material, said cover being secured in its closing position by an arrangement of screws 90, or other suitable fastening means. The cover or closure 89 is also made with a centrally disposed opening 91, and two other openings or holes, as 92 and 93, the purposes of which will be hereinafter more fully stated. Movably disposed within the opening 91 is a push-button or post 94, formed upon its inner end-portion, within the said cover or closure, with an enlargement 95, said post and enlargement being made of suitable insulating material. The said enlargement with the said post forms an annular shoulder 96 which limits the upward movement of said members, and the outward movement of the push-button or post, as will be evident.

As shown, the said enlargement 95 is hollow or socketed, as at 97, for movably or slidably disposing said enlargement over the previously mentioned collar or sleeve 82, a coiled compression spring 98 being disposed within the hollow or socketed portion thereof, and said spring bearing upon the upper end of the stem or shank 81, for normally maintaining the enlargement 95 and the push-button or post 94 in the raised positions indicated in said Figures 16 and 19 of the drawings. The lower end-portion of the said enlargement is also preferably convexly rounded, as at 99. Referring now to the block 87 it will be seen, that on one side it is also convexly rounded, as at 100, and in its side opposite said rounded portion, the block is made with a vertical channel 101, the upper edge-portion 102 of the block providing a hook-engaging stop, as indicated more particularly in Figures 17 and 19 of the drawings.

Suitably secured upon the off-set portion 84 of the main body 71, by means of a rivet, screw or pin 103, or other suitable fastening means, is a contact-establishing means of the general character illustrated in said Figures 16, 17, 18, 19 and 20, and more particularly in Figure 25 of the drawings, said device consisting, essentially, of a base-portion 104, resting upon said off-set 84, and provided with a suitably bent and upwardly extending spring-arm 105, having upon its free end an enlargement or head, as 106, adapted to ride upon the convex surface 100 of the block 87, and at times to make electrical contact with the previously mentioned enlargement or boss 80, as indicated in Figure 19. In addition, the said base-portion 104 may be provided with another upwardly projecting arm 107 which is curved at its free end, as at 108, said curved portion bearing directly upon the enlargement or head 106, and serving as an auxiliary spring for positively forcing the said enlargement or head upon the convex surface 100, or against the enlargement or boss 80, as will be understood. Extending laterally and upwardly from the said base-portion 104 is a resilient member 109, formed with a perforated end-portion 110 in which is mounted an adjustable electrical conductor 111, the screw-threaded shank of which is adjustably disposed in the internally threaded socket of a resistance element 112, preferably made of carbon, as shown in Figure 18, and which is connected by means of a lead 113 with the above-mentioned convoluted or screw-threaded metal collar or ring 74.

Extending from another portion of said base-portion 104 is a circuit-completing conductor element or member 114, which extends around the interior of the main body 71 of the device and is flattened-out, as at 115, for convenient connection with and attachment to the thermostatic control means to be presently described, and which is suitably mounted upon the previously mentioned off-set 85. This thermostatic control-element, in general, is similar in construction to the thermostatic control-element described in connection with circuit-interrupter or breaker illustrated in Figures 1 to 11 inclusive, and the same, as in that case, consists essentially of a continuous strip of thermostatic metal, comprising a pair of base-members 116 and 117, and an intermediately disposed and substantially U-shaped base member 118, from which extend, in upward directions, a plurality of resilient members 119, 120, 121 and 122, the members 119 and 120 being connected at their upper ends by a connecting portion 123, and the said members 121 and 122 being similarly connected at their upper ends by a connecting portion 124. The said base-members 116 and 117 are, respectively, provided with perforated ears 125 and 126 for the reception of rivets, screws or pins 127, or other suitable fastening means, by means of which the said thermostatic control-element is secured in its vertical position upon said off-set portion 85 within the chamber of the main body 71, as will be clearly evident from an inspection of the several figures of the drawings. Secured upon opposite sides of the portions 123 and 124 of the respective resilient members, is a cross-bar of suitable insulating material, said bar comprising a pair of bar-members 128 and 128', connected by a portion 129, and one of said members, as 128, having a perforated ear or lug, as 130, and the other member 128' being marginally chamfered, as at 131. Mounted upon and suitably secured to the U-shaped base-member 118 is an upwardly projecting standard or bracket 132, provided with a laterally extending pin 133 carrying the perforated portion 135 of an arm or bar 134. The upper end-portion 136 of said arm or bar is secured against movement in the perforation of the ear or lug 130, said portion 135 being further provided with a notch or serration 137, or similar retaining means, adapted to be brought into holding engagement with the stop provided by the upper edge-portion 102 of the block 87, as indicated in Figures 17 and 19 of the drawings. Attached to the rivet, screw, or pin 127 extending through the perforated ear or lug 125 of the thermostatic control-element is a circuit wire 138 which passes downwardly through the main body-portion 71 and is electrically connected at its other end with a portion of the convoluted or screw-threaded metal collar or ring 74.

Direction of the electric circuit of the circuit-breaker or interrupter shown and described in connection with said Figures 12 to 26 inclusive, when screwed into the socket, and when the various members of the interrupter-mechanism are in their normally set relations indicated in Figure 19 of the drawings, by pushing the push-button or post 94 in an inward direction, so as to cause the notched or serrated portion of the arm 134, due to the spring-like action of the members 119, 120, 121 and 122 of the thermostatic control-element in the direction away from the block 87, to be brought into holding or retaining engagement with the stop-edge 102 of said block, briefly is as follows:—

As soon as the operator removes the finger from the depressed push-button or post 94, the compressed spring 98 returns the said push-button or post to its initial position, the other parts of the mechanism remaining in their set positions, as will be fully understood from an inspection of said Figure 19. The electric circuit is therefore completed from the contact-establishing button 75, through the stem 78 to the enlargement or boss 80. Thence, by means of the enlargement or head 106 in contact therewith through the spring-arm 105 into the base-portion 104; thence by means of the conductor-element or member 114 and its part 115 into and out of the thermostatic control-element, into the leading-out wire or conductor 138 to the convoluted or screw-threaded ring or collar 74, thus completing the electric circuit with the socket into which the device has been screwed.

Thus, when the various parts of the device are in their set positions, indicated in said Figure 19, a complete electric circuit is established. At the moment, however, when an overload or short circuit occurs in the main line, the increase caused by the overload will cause the thermostatic control-element to become deflected in a direction toward the block 87, thereby automatically causing the disengagement of the arm 134 with the stop-edge 102 of the block, thereby permitting the compressed spring 88 to act and bring the various parts into the positions indicated in Figures 16 and 20, and thereby completely interrupting or breaking the electrical circuit, due to the separation of the contact-making elements 80 and 106, as will be evident.

It will also be understood, that the time an overload takes place, the tendency of the electrical circuit is to divide itself into two paths of direction, one path going through the conductor 114, through the thermostatic control-element, and out of the leading-out wire or conductor 138 to the metal collar or ring 74, and the other path being by means of the member 109 and the conductor-elements 111, resistance element 112 and lead 113, also to the metal collar or ring 74, in shunt around the thermostatic control-element. The total amount or quantity of current is therefore divided and properly reduced in its power, so that while sufficient current passes through the thermostatic control-element to properly deflect the same, the current is not of such strength that the future usefulness of the thermostatic control-element will be destroyed.

In some instances it may be necessary to manually release the set interrupter-mechanism of the device, so as to interrupt or break the electrical circuit through the circuit-interrupter or breaker, for protection of the workman when installing instrumentalities in the electric line, or when making necessary repairs.

One style of such manually operated release device is shown in connection with said Figures 12 to 20 inclusive, and in Figure 24, and the same consists, essentially of a stem 139 which is movably disposed in the hole or perforation 92 of the cover or closure 89, said stem being provided upon its end-portion, outside said cover, with an enlargement or head 140, and upon its other end-portion, within said cover, with an end-member 141 having a tapered or chamfered surface, as 142. Under normal conditions, this end-member 141 is located above the previously mentioned members 128 and 128' of the cross-bar carried by the thermostatic control-element, being held in its raised position by a coil-spring 143 encircling that portion of the stem 139 between its enlargement or head 140 and the top of the cover or closure 89. When pressure is manually applied to said head or enlargement 140, the tapered surface 142 of the member 141 is caused to ride against the tapered or chamfered surface 131 of the bar-member 128', whereby the thermostatic control-element is deflected toward the block 87, to separate the retaining arm 134 from its holding engagement with the stop-edge 102 of said block, thus permitting the several parts of the device to move from the positions indicated in Figure 19 to the positions represented in Figure 20, and whereby the electric circuit through the device is broken or interrupted, as will be clearly understood from an inspection of said Figure 20. As soon as the pressure is removed from the enlargement or head 140, the spring 143 will again return the stem 139 and its member 141 to their normal initial positions represented in Figures 16, 17 and 19, for once more permitting the set relation of the parts of the interrupter-mechanism.

The circuit-interrupter device or breaker may also be provided with means which will indicate to a person whether the interrupter mechanism is set to establish a complete or non-interrupted electric circuit through the device, or whether the interrupter-mechanism has been released, and the electric circuit through the device has been interrupted or become broken.

One form of such indicating means is illustrated in Figures 12, 13, 14, 21, 22 and 26 of the drawings, and the same consists, essentially, of a spring-like member 144 attached to and extending in an upward direction from the block 87, said member being provided at its free end with a stud 145, or the like, preferably made of insulating material, which is movably disposed in the hole or perforation 93 in the cover or closure 89 and projects upon the outside of the cover, as shown. When the interrupter-mechanism has been set, to produce a complete electric circuit, then the stud 145 will be in the lowered position shown in Figure 12, indicating that the mechanism is in its properly set condition, but when the mechanism has been released, and the electric circuit broken, then the stud 145 is in the raised or outwardly moved position, represented in Figure 13, thereby indicating the released condition of the interrupter-mechanism, and the open condition of the electric-circuit. While I prefer to make the member 144 in the form of a flexible coil, this is not a necessity and the said member may be otherwise made. I prefer, however, to make this member 144 in the form of a coil, for the reason that when pressure is inadvertently applied upon the stud 145, the coils of the member 144 are merely brought into a compact relation, without in the least affecting the positions of the various movable parts of the interrupter-mechanism, as will be evident.

In all other respects, the general arrangement and operation of the several elements of the circuit-interrupter or breaker illustrated in said Figures 12 to 26 inclusive, is substantially the same as the general arrangement and operation of the elements when arranged as shown in the device illustrated in said Figures 1 to 11 inclusive.

I am fully aware, that other changes may be made in the general arrangements and combinations of the various devices and parts, as well as in the details of the construction of the said parts, without departing from the scope of the present invention, as set forth in the foregoing specification, and as defined in the clauses of the claims which are appended thereto. Hence, I do not limit my invention to the exact arrangements and combinations of the several devices and parts as described in the said specification, nor do I confine myself to the exact details of the construction of the said parts, as illustrated in the accompanying drawings.

I claim:—

1. An automatic circuit-interrupter, comprising a housing of insulating material having external contacts, internal laterally separatable make and break contacts, a longitudinally movable interrupter means, spring means for moving said interrupter intermediate said make and break contacts to separate the same, a detent to normally hold said interrupter means withdrawn from between said make and break contacts and its spring under compression, a thermostatic control element to release said detent connected in series with said make and break contacts, means connecting said make and break contacts and thermostatic control element in circuit between said external contacts, and manually operable means to move said interrupter to detent engaged inactive position, said latter means having a push-button exteriorly projected from said housing.

2. In an automatic circuit breaker, laterally separatable make and break contacts, a longitudinally movable interrupter means, spring means for moving said interrupter means intermediate said make and break contacts to separate the same, a thermostatic control element connected in series with said make and break contacts, said control element consisting in a series of base-members, a plurality of flexible members of thermostatic metal extending from said base members, said flexible members being interconnected so as to provide a continuous strip, said flexible members being adapted to flex under electrical overload, a pivoted detent to normally hold said interrupter means inactive, means to connect said control element with said detent whereby the latter is released when said control element is flexed, and manually operable means to set said interrupter means in engaged relation to said detent.

3. A circuit interrupter, comprising a housing of insulating material having a screw-plug connection providing external contacts, a central conductive stem within said housing connected with one external contact having at its upper end a stationary internal contact, a movable internal contact electrically connected with the other external contact and adapted to normally engage said stationary internal contact, an interrupter block of insulating material slidably disposed on said central stem, spring means for moving said interrupter block to interpose the same between said internal contacts, a depressible means of insulating material also slidable over said stationary internal contact to remove said interrupter block from interposed relation to said internal contacts, said depressible means having a push button portion projecting exteriorly from said casing, said depressible means serving to also separate said internal contacts while said interrupter block is being removed from interposed relation thereto, spring means for yieldably holding said depressible means in normal raised position, a thermostatically controlled detent means for normally holding said interrupter block removed from interposed relation to said internal contacts, and said latter means being electrically connected in series with said internal contacts between said external contacts.

4. A circuit interrupter as defined in claim 3, provided with an indicating means adapted to indicate the inactive or active position of said interrupter block, comprising a spring-like member extending from said interrupter block, and an indicator stud connected with the free end portion of said spring-like member to project externally from said housing.

5. A circuit interrupter, comprising a housing of insulating material having a screw-plug connection providing external contacts, a central conductive stem within said housing connected with one external contact having at its upper end a stationary internal contact, a movable internal contact electrically connected with the other external contact and adapted to normally engage said stationary internal contact, an interrupter block of insulating material slidably disposed on said central stem, spring means for moving said interrupter block to interpose the same between said internal contacts, a depressible means of insulating material also slidable over said stationary internal contact to remove said interrupter block from interposed relation to said internal contacts, said depressible means having a push button portion projecting exteriorly from said casing, said depressible means serving to also separate said internal contacts while said interrupter block is being removed from interposed relation thereto, spring means for yieldably holding said depressible means in normal raised position, a thermostatic control element connected in series with said internal contacts between said external contacts, said control element consisting in a series of base members, a plurality of flexible members of thermostatic metal extending from said base members, said flexible members being interconnected so as to provide a continuous strip, said flexible members being adapted to flex under electrical overload, a pivoted detent to normally hold said interrupter block in depressed inactive position, and means to associate said control element with said detent whereby the latter is released from said interrupter block when said control element is flexed.

6. A circuit interrupter as defined in claim 5, provided with an indicator adapted to indicate the inactive or active position of said interrupter block, comprising a spring-like member extending from said interrupter block, and an indicator stud connected with the free end portion of said spring-like member to project externally from said housing.

7. A circuit-interrupter, comprising a housing of insulating material of the conventional screw-plug type, an electric circuit therein, a spring actuated interrupter means in said housing, contact-establishing means in said circuit, means for setting said interrupter means in normal disengaged relation to said contact-establishing means, a thermostatic releasing means normally in retaining engagement with the interrupter means, said thermostatic releasing means being provided with a cross-bar of insulating material having a chamfered surface-portion, and manually operable means for releasing said interrupter means, consisting of a spring-controlled push-rod provided with a member having a tapered surface adapted to be brought into co-operative engagement with the chamfered surface-portion of said cross-bar.

8. A circuit-interrupter, comprising a housing of insulating material, an electric circuit therein, an interrupter means in said housing, and indicating means adapted to indicate the inactive or active position of the interrupter means with relation to the electric circuit, consisting of a spring-like member extending from said interrupter means, and an indicator-stud upon the free end-portion of said spring-like member to project externally from said housing.

9. A circuit-interrupter, comprising a housing of insulating material, an electric circuit therein, an interrupter means in said housing consisting in a movably disposed block of insulating material, and indicating means adapted to indicate the inactive or active position of the interrupter means with relation to the electric circuit, comprising a spring-like member extending from said block, and an indicator-stud upon the free end-portion of said spring-like member to project externally from said housing.

10. In a circuit breaker the combination of a hollow plug adapted to fit a standard lamp socket, external contacts on said plug for engagement with the contacts of said socket, a pair of spring contact members within said plug, one of said members being connected to one of said external contacts, a thermostatic element connected in series with the other of said spring contacts and the other external contact with said plug, a slide of insulating material supported in said plug in position to move between said contacts, a spring tending to thrust said slide between said contacts and a shoulder on said slide adapted to be engaged by said thermostatic element when current of less than a predetermined value is flowing through said plug, said thermostatic element being designed to release said shoulder on the flow of excess current and thereby permit said spring to force said slide between said contacts and break the circuit.

11. An automatic circuit-interrupter, comprising a housing of insulating material having external contacts, internal laterally separatable make and break contacts, a spring pressed interrupter means of insulating material movable between said make and break contacts, a detent to hold said interrupter means inactive, a thermostatic control element to release said detent connected in series with said make and break contacts, means connecting said make and break contacts and said thermostatic control element in circuit between said external contacts, a push-button device for manually moving said interrupter means from between said make and break contacts and into engagement with said detent, said push-button device having means to maintain said make and break contacts separated while said interrupter means is moved to inactive position and until said push-button is returned to normal initial position.

In testimony, that I claim the invention set forth above I have hereunto set my hand this 23rd day of February, 1926.

ERNEST AICHELE.